United States Patent

Blandino et al.

[11] Patent Number: 6,032,755
[45] Date of Patent: *Mar. 7, 2000

[54] METHOD AND APPARATUS FOR COMPENSATING TORQUE STEER

[75] Inventors: Don Blandino, Sterling Hts.; Joseph D. Miller, Farmington Hills; Chris Mantjios, Troy, all of Mich.

[73] Assignee: TRW Inc., Lyndhurst, Ohio

[*] Notice: This patent issued on a continued prosecution application filed under 37 CFR 1.53(d), and is subject to the twenty year patent term provisions of 35 U.S.C. 154(a)(2).

[21] Appl. No.: 08/594,253

[22] Filed: Jan. 30, 1996

[51] Int. Cl.⁷ .............................. G06G 7/70; B62D 6/04
[52] U.S. Cl. .............................. 180/446; 180/422; 701/41
[58] Field of Search ..................... 180/443, 446, 180/417, 421, 422, 423; 364/424.051, 424.052; 701/41, 42

[56] References Cited

U.S. PATENT DOCUMENTS

| | | |
|---|---|---|
| 4,702,334 | 10/1987 | Takeshima et al. |
| 4,753,308 | 6/1988 | Noto et al. |
| 4,765,434 | 8/1988 | Kawamoto et al. ............ 180/249 |
| 4,803,629 | 2/1989 | Noto et al. |
| 5,000,278 | 3/1991 | Morishita. |
| 5,064,014 | 11/1991 | Ishizaka et al. |
| 5,253,728 | 10/1993 | Matsuno et al. ............ 180/446 |
| 5,259,473 | 11/1993 | Nishimoto. |
| 5,291,962 | 3/1994 | Momiyama et al. ............ 180/417 |
| 5,417,298 | 5/1995 | Shibahata. |
| 5,511,630 | 4/1996 | Kohata et al. ............ 180/421 |
| 5,528,497 | 6/1996 | Yamamoto et al. ............ 180/446 |
| 5,623,409 | 4/1997 | Miller ............ 180/446 |
| 5,774,819 | 6/1998 | Yamamoto et al. ............ 701/41 |
| 5,845,222 | 12/1998 | Yamamoto et al. ............ 701/41 |

FOREIGN PATENT DOCUMENTS

| | | |
|---|---|---|
| 19536989 | 11/1996 | Germany. |
| 4123980 | 4/1992 | Japan. |
| 62182873 | 11/1997 | Japan. |

OTHER PUBLICATIONS

Research Disclosure entitled "Torque Steer Control System", dated Jul. 1, 1991, p. 488.

Primary Examiner—Kevin Hurley
Assistant Examiner—Avraham H. Lerner
Attorney, Agent, or Firm—Tarolli, Sundheim, Covell, Tummino & Szabo L.L.P.

[57] ABSTRACT

A system (10) for compensating torque steer in a vehicle power assist steering system for a front wheel drive vehicle includes an engine speed sensor (60) or a road wheel drive torque sensor (61). A torque sensor (32) senses applied steering torque. A steering assist motor (28) provides power assist to assist the vehicle operator in steering the vehicle. A controller (62) controls the power assist motor in response to the sensed applied steering torque and in response to one of the sensed engine speed or the road wheel drive torque to compensate for torque steer.

18 Claims, 2 Drawing Sheets

METHOD AND APPARATUS FOR COMPENSATING TORQUE STEER

TECHNICAL FIELD

The present invention is directed generally to controlling a vehicle power steering system and specifically directed to a method and apparatus for compensating torque steer in front wheel drive vehicles.

BACKGROUND OF THE INVENTION

In most front wheel drive vehicles, a phenomenon known as "torque steer" is experienced. Torque steer is a vehicle steering effect resulting from the torque developed by a vehicle engine. There are two primary causes of torque steer. First, torque steer results when torque developed by the vehicle engine is transferred unevenly to the vehicle front wheels. Second, uneven progress of the vehicle front wheels in response to the torque developed by the vehicle engine also results in torque steer.

The concept of torque steer is most easily understood by way of example. Assume a driver is travelling in a front wheel drive vehicle on a straight path down a straight road. If this driver suddenly accelerates, i.e., rapidly increases engine revolutions-per-minute ("RPMs"), the vehicle will tend to steer either left or right as a result of the torque steer effect on the vehicle. This situation thus requires the driver to compensate for the torque steer effect so as to maintain his correct path of travel down the road.

SUMMARY OF THE INVENTION

The present invention is directed to a method and apparatus for compensating for torque steer in front wheel drive vehicles and eliminate the need for driver interaction to correct for the effects of torque steer.

In accordance with one embodiment of the present invention, an apparatus is provided for compensating torque steer in a vehicle having a power assist steering system. The apparatus comprises means for sensing an operating characteristic of a vehicle indicative of torque steer. Means are provided for sensing an operator applied steering torque. The apparatus further includes control means for controlling the power assist steering system in response to the sensed operator applied steering torque and in response to the sensed torque steer characteristic so as to compensate for torque steer.

In accordance with a preferred embodiment of the present invention, the means for sensing an operating characteristic of a vehicle indicative of torque steer is engine speed or road wheel drive torque.

In accordance with another embodiment of the present invention, a method is provided for compensating torque steer in a vehicle power assist steering system. The method comprising the steps of sensing a vehicle operating characteristic indicative of torque steer, sensing applied steering torque by a vehicle operator, and controlling the power assist steering system in response to the sensed applied steering torque and the sensed operating characteristic indicative of torque steer so as to compensate for torque steer.

In accordance with a preferred embodiment, the step of sensing an operating characteristic indicative of torque steer includes either the step of sensing rotations-per-minute of the vehicle engine or the step of sensing road wheel drive torque.

BRIEF DESCRIPTION OF THE DRAWINGS

The foregoing and other features and advantages of the present invention will become apparent to one skilled in the art to which the present invention relates upon consideration of the following detailed description of the invention with reference to the accompanying drawing, wherein.

DESCRIPTION OF PREFERRED EMBODIMENTS

Figure 1:
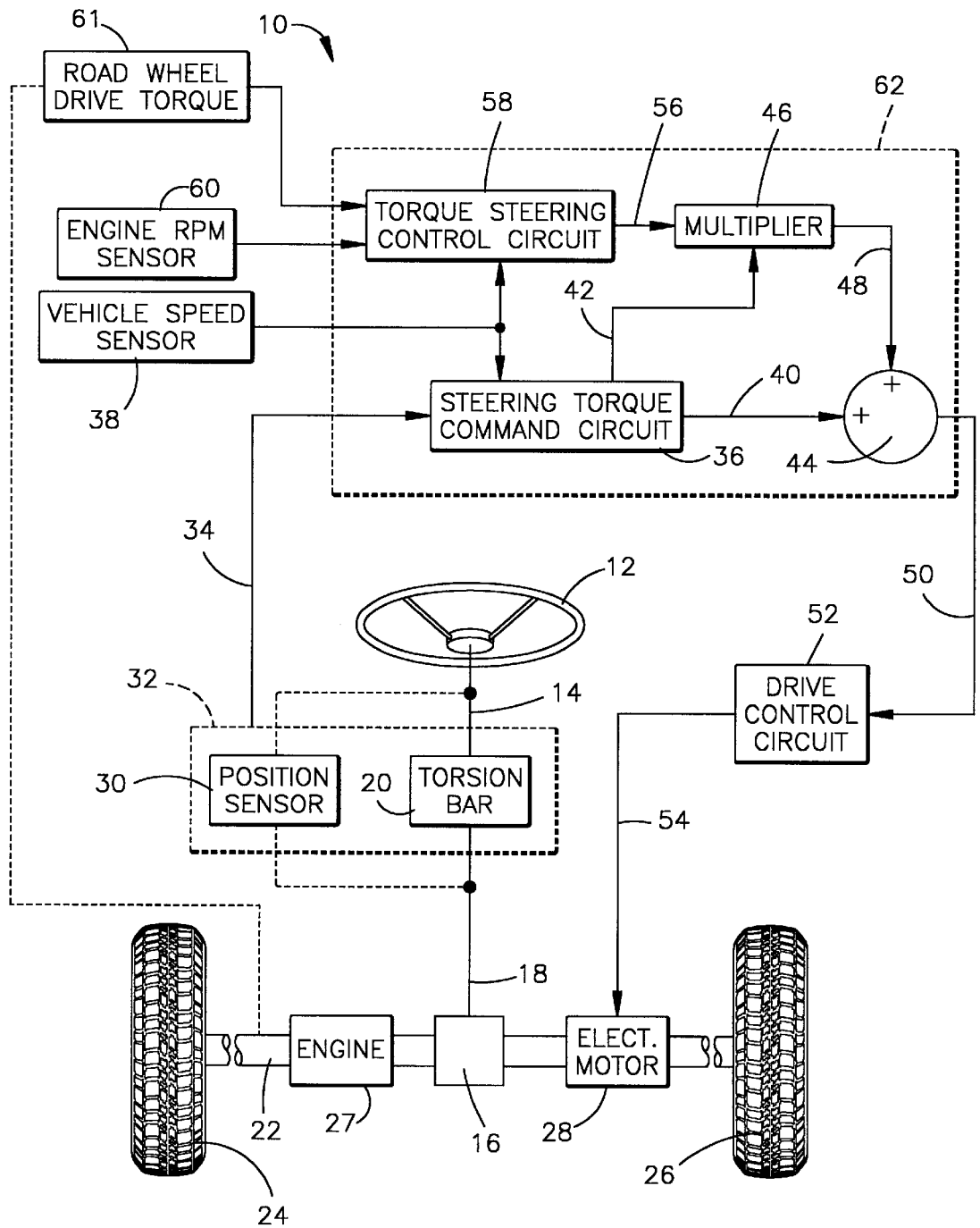
FIG. 1 is a block diagram of a torque steer compensation system made in accordance with the present invention.
Figure 2:
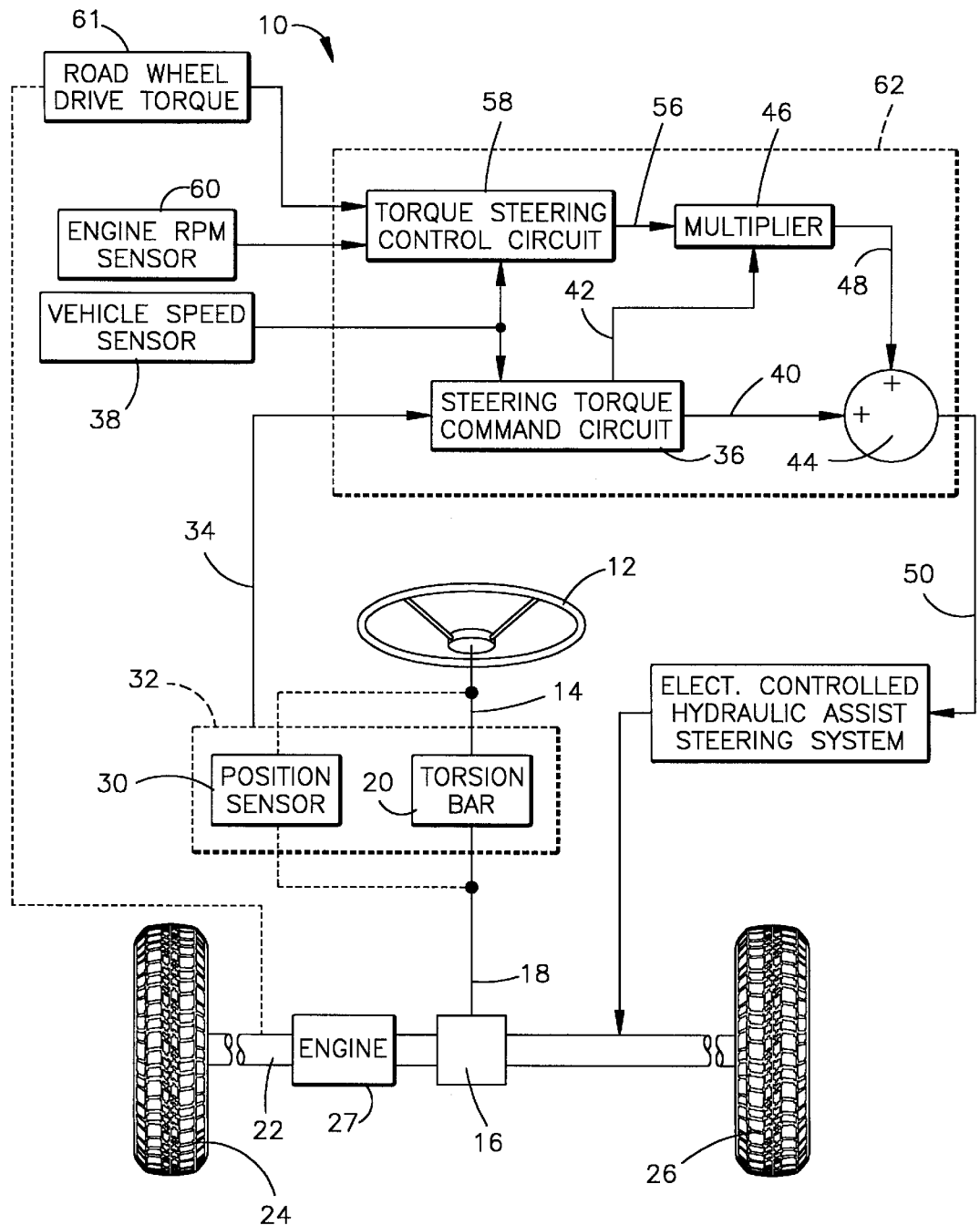
FIG. 2 is a diagram similar to FIG. 1, and shows another system made in accordance with the present invention.

Referring to FIG. 1, a vehicle torque steer compensation system 10, in accordance with the present invention, includes a vehicle steering wheel 12 connected to an input shaft 14. A pinion gear 16 is connected to an output shaft 18 (FIG. 2). The input shaft 14 is coupled to the output shaft 18 through a torsion bar 20. The torsion bar 20 twists in response to torque applied to the vehicle steering wheel 12 and permits relative rotation between the input shaft 14 and the output shaft 18. Stops, not shown, limit the amount of relative rotation between the input shaft 14 and the output shaft 18 in a manner known in the art.

The pinion gear 16 has helical gear teeth (not shown) which are meshingly engaged with straight cut gear teeth (not shown) on a linear steering member or rack 22. The rack 22 is coupled to vehicle steerable wheels 24 and 26 through steering linkage in a known manner. The pinion gear 16 together with the rack 22 forms a rack and pinion gear set.

The vehicle's engine 27 is drivably coupled to the wheels 24, 26 in a known manner. The wheels 24, 26 are the front wheel drive wheels of the vehicle. The present invention is also applicable to an all wheel drive vehicle.

When the steering wheel 12 is turned, the rack and pinion gear set converts the rotary motion of the steering wheel 12 into linear motion of the rack 22. When the rack 22 moves linearly, the steerable wheels 24 and 26 pivot about their associated steering axes and the vehicle is steered. An electric assist motor 28 is drivingly connected with the rack 22 through, preferably, a ball-nut drive arrangement (not shown). The motor 28, when energized, provides power assist torque to aid a vehicle driver in steering movement of the rack 22 and, in turn, steering of the vehicle.

A shaft position sensor 30 is operatively connected across the input shaft 14 and the output shaft 18. The shaft position sensor 30, in combination with the torsion bar 20, form a torque sensor 32. The shaft position sensor 30 provides an output signal on line 34 having a value indicative of the relative rotational position between the input shaft 14 and the output shaft 18. This relative rotational position between the input shaft 14 and the output shaft 18 is indicative of the steering torque applied by the vehicle operator to the vehicle steering wheel 12. Therefore, the value of the output signal on line 34 from the shaft position sensor 30 is indicative of the value or amount of steering torque applied to the vehicle steering wheel 12 and is referred to as the "applied steering torque."

The applied steering torque signal on line 34 is connected to a steering torque command circuit 36. The steering torque command circuit 36 determines the amount of desired assist torque to be provided by the motor 28 and provides a torque command output 40 having a value indicative of the determined amount of desired torque assist. The torque command output 40 is a function of two parameters: (i) the value of the applied steering torque; and (ii) vehicle speed.

A vehicle speed sensor 38 provides a vehicle speed output signal to the torque command circuit 36 having a value indicative of the sensed vehicle speed. Typically, the amount of torque assist desired from the motor 28 decreases as vehicle speed increases. This is referred to in the art as "speed proportional steering." In addition to the torque command output 40, the steering torque command circuit 36 provides a sign output 42 which has a sign value indicative of the direction the applied steering torque (i.e., left turn or right turn) indicated by the output on line 34 of the torque sensor 32. The operation of a torque command circuit, such as circuit 36, for control of an electric assist motor in response to applied steering torque and vehicle speed is known in the art and a detailed description of such operation is not discussed herein in detail. An example of a torque command circuit in accordance with the present invention is described in U.S. Pat. No. 5,257,828 to Miller et al.

The output 40 of the steering torque command circuit 36 is connected to one input of a summing circuit 44. A multiplier circuit 46 provides a torque steer compensation output 48 which is connected to another input of the summing circuit 44. The summing circuit 44 provides a compensated torque command output 50 which is equal to the sum of the torque command value on output 40 and the torque steer compensation value on output 48. The value of the compensated torque command output 50 is the value of the assist torque needed to cause the motor 28 to: 1) provide the desired steering assist torque (output 40); and 2) compensate for the torque steer effect on the vehicle (output 48).

The torque steer compensation output 48 is the value of the sign output 42 times the value of a torque steer output 56 provided by a torque steer control circuit 58. The torque steer control circuit 58 determines the value of the torque steer output 56 in response to: 1) vehicle speed sensed by the vehicle speed sensor 38; and 2) vehicle engine r.p.m. sensed by an engine r.p.m. sensor 60. In accordance with a preferred embodiment, the torque steer control circuit 58, along with the multiplier 46, summing circuit 44, and steering torque command circuit 36 are all programmed in a microcomputer controller 62. The engine speed is indicative of the amount of torque steer.

In accordance with an alternative embodiment of the present invention, a road wheel drive torque sensor 61 is operatively coupled between the vehicle engine 27 and the driven wheels 24, 26 preferably in the vehicle's transmission. The road wheel drive torque sensor provides an electrical signal to the torque steer control circuit 58 having a characteristic indicative of the drive torque being applied to the driven wheels 24, 26. The amount of the drive torque applied is indicative of the amount of the torque steer.

The functional relationship between the value of the torque steer compensation output 56 and vehicle speed from sensor 38 and engine r.p.m. from sensor 60 or road wheel drive torque from sensor 61 is dependent upon the particular vehicle platform of interest. It is anticipated that each vehicle platform will have an associated functional relationship. For a particular vehicle platform of interest, the torque steer compensation functional relationship may be determined empirically and stored in the form of an internal look-up table (memory) in the microcomputer controller 62. Alternatively, the torque steer compensation functional relationship may be defined by an equation stored in the controller 62.

The torque compensating output 50 provided by the summing circuit 44 is connected to a drive control circuit 52. The drive control circuit 52 uses the torque compensated output 50 in controlling the motor energization current and the motor direction. A motor drive output 54 is provided to the motor 28 to energize the motor 28 which causes the motor to develop the compensated torque assist, i.e., torque assist compensated for any sensed torque steer effect.

Although the present invention has been described with regard to an electric power assist steering system, the invention is not limited to such a system. The present invention may be used with equal utility in a front wheel drive or all wheel drive vehicle having a hydraulic power steering system (FIG. 2). In a hydraulic system, instead of an electrically controlled electric assist motor, hydraulic differential pressure is electrically controlled in response to measured engine r.p.m. or sensed road wheel drive torque to compensate for vehicle torque steer. Electric control of a hydraulic assist steering system is accomplished through electrical control of a valve between a pump and the hydraulic assist device.

From the above description of the invention, those skilled in the art will perceive improvements, changes, and modifications. Such improvements, changes, and modifications within the skill of the art are intended to be covered by the appended claims.

Having fully described the invention, the following is claimed:

1. An apparatus for compensating for torque steer in a vehicle having a power assist steering system, said apparatus comprising:

means for sensing at least one operating characteristic of a vehicle indicative of torque steer, said means for sensing at least one operating characteristic including means for sensing engine rotations-per-minute of the vehicle engine;

means for sensing an operator applied steering torque; and control means for controlling, in response to the sensed operator applied steering torque and in response to the at least one sensed operating characteristic, including engine rotations, indicative of torque steer, the power assist steering system to compensate for torque steer.

2. The apparatus of claim 1 wherein said apparatus further includes means for sensing vehicle speed, said control means being further responsive to sensed vehicle speed to compensate for said torque steer.

3. The apparatus of claim 1 wherein said means for sensing at least one operating characteristic of the vehicle indicative of torque steer includes means for sensing road wheel drive torque.

4. The apparatus of claim 3 wherein said apparatus further includes means for sensing vehicle speed, said control means being further responsive to sensed vehicle speed to compensate for said torque steer.

5. The apparatus recited in claim 1 wherein said power assist means is an electric motor.

6. The apparatus recited in claim 1 wherein said power assist means is a hydraulic device.

7. A vehicle power assist steering system comprising:

sensing means for sensing rotations-per-minute (r.p.m.) of a vehicle engine;

torque sensing means for sensing steering torque applied to a vehicle steering wheel by a vehicle operator;

an electric assist motor for providing a steering assist force to assist the vehicle operator in steering the vehicle; and control means for controlling, in response to the sensed applied steering torque and in response to the sensed engine r.p.m., said electric assist motor to compensate for torque steer.

8. A method for compensating torque steer in a vehicle power assist steering system, said method comprising the steps of:

sensing at least one vehicle operating characteristic indicative of torque steer, including sensing rotations-per-minute of the vehicle engine;

sensing applied steering torque by a vehicle operator; and controlling the power assist steering system to compensate for torque steer, said step of controlling being responsive to said sensed applied steering torque and said at least one sensed operating characteristic, including engine rotations, indicative of torque steer.

9. The method and apparatus of claim 8 further including the step of sensing vehicle speed, said step of controlling is further responsive to said sensed vehicle speed.

10. The method of claim 8 wherein said step of sensing at least one operating characteristic indicative of torque steer includes the step of sensing road wheel drive torque.

11. The method of claim 10 further including the step of sensing vehicle speed, said step of controlling is further responsive to said sensed vehicle speed.

12. An apparatus for compensating for torque steer in a vehicle having a power assist steering system, said apparatus comprising:

means for sensing engine rotations-per-minute of the vehicle engine as a characteristic that is indicative of torque steer;

means for sensing an operator applied steering torque; and control means for controlling the power assist steering system to compensate for torque steer in response to the sensed operator applied steering torque and in response to the sensed engine rotations.

13. An apparatus for compensating for torque steer in a vehicle having a power assist steering system, said apparatus comprising:

means for sensing engine rotations-per-minute of the vehicle engine;

means for sensing an operator applied steering torque;

means for determining a torque steer compensation amount required within the power assist steering system to negate the effect of torque steer using at least the sensed engine rotations; and means for controlling the power assist steering system in response to the sensed operator applied steering torque and in response to the determination of the torque steer compensation amount.

14. The apparatus of claim 13, wherein said means for determining includes a microcomputer for processing torque steer indicative information provided from the sensed engine rotations and for deriving a torque steer compensation function relationship using the provided information, said microcomputer includes means for outputting a signal to said control means that indicates the derived torque steer compensation function.

15. The apparatus of claim 14, including means for sensing vehicle speed, said microcomputer also being for processing information provided from the sensed vehicle speed and for deriving the torque steer compensation function relationship using the sensed vehicle speed information.

16. The apparatus of claim 14, including means for sensing road wheel drive torque, said microcomputer also being for processing information provided from the sensed road wheel drive torque and for deriving the torque steer compensation function relationship using the sensed road wheel drive torque.

17. An apparatus for compensating for torque steer in a vehicle having a power assist steering system, said apparatus comprising:

means for sensing engine rotations-per-minute of the vehicle engine; and control means for controlling the power assist steering system to compensate for torque steer, said control means including means for determining a power assist control signal using the sensed engine rotations.

18. The apparatus of claim 17, wherein said means for determining a power assist control signal includes means for determining a torque steer compensation amount.

* * * * *